(12) United States Patent  
Goranson et al.

(10) Patent No.: US 8,751,918 B2  
(45) Date of Patent: Jun. 10, 2014

(54) DIGITAL SYSTEM FOR ORGANIZING DIVERSE INFORMATION

(75) Inventors: Ted Goranson, Virginia Beach, VA (US); Tobias Schachman, Somerville, MA (US)

(73) Assignee: Earl Industries, LLC, Portsmouth, VA (US)

( * ) Notice: Subject to any disclaimer, the term of this patent is extended or adjusted under 35 U.S.C. 154(b) by 1297 days.

(21) Appl. No.: 12/105,143

(22) Filed: Apr. 17, 2008

(65) Prior Publication Data

US 2008/0288856 A1 Nov. 20, 2008

Related U.S. Application Data

(60) Provisional application No. 60/912,243, filed on Apr. 17, 2007.

(51) Int. Cl.  
*G06F 17/27* (2006.01)

(52) U.S. Cl.  
USPC .......................................... 715/208; 715/760

(58) Field of Classification Search  
CPC ................. G06F 17/2247; G06F 17/30899  
USPC .................... 715/208, 760; 707/702, 726  
See application file for complete search history.

(56) References Cited

U.S. PATENT DOCUMENTS

| | | | | |
|---|---|---|---|---|
| 5,175,848 A * | 12/1992 | Dysart et al. | ........................... | 1/1 |
| 5,303,379 A * | 4/1994 | Khoyi et al. | .................... | 717/166 |
| 5,546,519 A * | 8/1996 | Berry | ........................... | 715/763 |
| 6,751,777 B2 * | 6/2004 | Bates et al. | .................... | 715/206 |
| 7,487,515 B1 * | 2/2009 | Jones et al. | .................... | 719/328 |
| 2002/0091768 A1 | 7/2002 | Balasubramanian | | |
| 2002/0095454 A1 * | 7/2002 | Reed et al. | ..................... | 709/201 |
| 2004/0117773 A1 * | 6/2004 | Nicolle | .......................... | 717/136 |
| 2004/0243921 A1 * | 12/2004 | Carr et al. | ...................... | 715/500 |
| 2004/0267779 A1 * | 12/2004 | Carter et al. | ................... | 707/100 |
| 2006/0059165 A1 * | 3/2006 | Bosloy et al. | .................... | 707/10 |
| 2006/0093103 A1 * | 5/2006 | Timmins et al. | ........... | 379/88.19 |
| 2006/0173873 A1 | 8/2006 | Prompt et al. | | |
| 2006/0294098 A1 | 12/2006 | Thomson et al. | | |

OTHER PUBLICATIONS

International Search Report and Written Opinion dated Aug. 18, 2008 issued in PCT Application No. PCT/US2008/60639.

* cited by examiner

*Primary Examiner* — Doung Hutton, Jr.  
*Assistant Examiner* — Brian Garmon  
(74) *Attorney, Agent, or Firm* — Dickstein Shapiro LLP

(57) ABSTRACT

A system for creating links among diverse elements in order to convey a variety of logical relationships. The system uses a unique approach to browser development in order to allow for the delayed transformation of data which has undergone either a change to its actual value, or a change in its relationship to other data. Linked data is left unevaluated until a user desires to view the data through a user interface. This delayed evaluation conserves bandwidth and system resources, and further enables the system to more efficiently create, organize, and maintain relationships between large volumes of diverse elements.

23 Claims, 19 Drawing Sheets

FIG. 14

XML Document

```
<outline>
    <content><header>An example outline</header></content>
    <children>
        <outline>
            <content><header>Child 1</header></content>
            <children>
                <outline>
                    <content><header>Grandchild 1</header></content>
                </outline>
                <f:thunk>
160 ——         <f:function select="path/to/xsl/transformation" />
                    <f:source select="a/remote/xml/document" />
                </f:thunk>
            </children>
        </outline>
        <outline>
            <content><header>Child 2</header></content>
        </outline>
        <outline>
            <content><header>Child 3</header></content>
        </outline>
    </children>
</outline>
```

FIG. 18

Client's XHTML

```
<html>...
    <div class="main-content">
        <div class="pane">...
            <div class="outline">
                <f:notelocation linkid="1" velx="1" vely="0" />
                28 influential articles
            </div>
            ...
            <div class="outline">
                <f:notelocation linkid="2" velx="1" vely="0" />
                Sisters, daughters
            </div>
        ...</div>
        <div class="pane">...
            <div class="outline">
                <f:notelocation linkid="2" velx="-1" vely="0" />
                First proposed by Nelson in 1969
            </div>
            ...
            <div class="outline">
                <f:notelocation linkid="1" velx="-1" vely="0" />
                Typed links
            </div>
        </div>
    ...</div>
    <div class="links">
        <f:thunk>
            <f:function select="drawSVGlinks.xsl" />
            <f:source select="workspace/.../locations" />
        </f:thunk>
    </div>
...</html>
```

Client's Workspace — 172

```
<workspace>
    ...
    <locations>
        <location x="186" y="66"
            linkid="1" velx="1" vely="0" />
        <location x="174" y="121"
            linkid="2" velx="1" vely="0" />
        <location x="406" y="48"
            linkid="2" velx="-1" vely="0" />
        <location x="406" y="84"
            linkid="1" velx="-1" vely="0" />
    </locations>
    ...
</workspace>
```

FIG. 19

Client's XHTML

```
<html>...
  <div class="main-content">
    <div class="pane">...
      <div class="outline">
        <f:notelocation linkid="1" velx="1" vely="0" />
        28 influential articles
      </div>
      ...
      <div class="outline">
        <f:notelocation linkid="2" velx="1" vely="0" />
        Sisters, daughters
      </div>
    </div>
    ...</div>
    <div class="pane">...
      <div class="outline">
        <f:notelocation linkid="2" velx="-1" vely="0" />
        First proposed by Nelson in 1969
      </div>
      ...
      <div class="outline">
        <f:notelocation linkid="1" velx="-1" vely="0" />
        Typed links
      </div>
    </div>
  </div>
  <div class="links">                          ⎯⎯ 174
    <svg:svg class="svg-links">
      <svg:path fill="none" stroke-width="2" stroke-color="#fc0"
        d="M 186 66 C 286 66 306 84 406 84" />
      <svg:path fill="none" stroke-width="2" stroke-color="#fc0"
        d="M 174 121 C 274 121 306 48 406 48" />
    </svg:svg>
  </div>
...</html>
```

Client's Workspace

```
<workspace>
  ...
  <locations>
    <location x="186" y="66"
      linkid="1" velx="1" vely="0" />
    <location x="174" y="121"
      linkid="2" velx="1" vely="0" />
    <location x="406" y="48"
      linkid="2" velx="-1" vely="0" />
    <location x="406" y="84"
      linkid="1" velx="-1" vely="0" />
  </locations>
  ...
</workspace>
```

DIGITAL SYSTEM FOR ORGANIZING DIVERSE INFORMATION

CROSS REFERENCE TO RELATED APPLICATION

This application claims the benefit of U.S. provisional patent application No. 60/912,243, filed on Apr. 17, 2007, the disclosure of which is incorporated herein by reference in its entirety

FIELD OF THE INVENTION

The embodiments disclosed herein relate to a user interface capable of organizing diverse types of information.

BACKGROUND OF THE INVENTION

User interface engineers have regularly conceptualized systems that create links among diverse elements. Certain concepts have elements that include, for example, presentations of databases, code sources, and objects in images. Other concepts focus on type-links which are designed to convey a collection of associations. Some engineers have conceptualized the collection of such associations as relations found in databases, while others have more flexible associations in mind that convey logical relationships.

Despite the many conceptions noted above, a practical implementation of type-linking diverse elements is still lacking. The world wide web has had a role in hindering progress toward a practical implementation of type-links. Instead of type-links, the links of the world wide web are displaced one after the other. Developing user interfaces that are congruent with the world wide web has thereby stunted the original vision of type-linked user interfaces connected to an internet backbone. What is needed is a browser-based implementation having a type-link foundation that is capable of integrating diverse elements.

In view of the foregoing, there exists a need in the art for a system capable of creating links among diverse elements in order to convey a variety of logical relationships. To do so, the system should treat the traditional data elements as data, while simultaneously treating the logical relationships created by the actions of a user as data. The system—by representing both traditional data and relationships as data—becomes self-sufficient with respect to propagating changes throughout the system whenever either a traditional data element has changed, or a logical relationship between two or more data elements has changed. Additionally, the system should delay propagating necessary changes within the system until at least one of the elements is accessed by a user. Leaving linked data unevaluated until a user requests the data through a user interface enables both bandwidth conservation, and local computer resource conservation. Conserving local computing resources enables the system, teamed with a user, to more efficiently create, organize, and maintain relationships between large volumes of diverse elements.

BRIEF DESCRIPTION OF THE DRAWINGS

These and other embodiments are described by the following figures and detailed description.

FIG. 14 illustrates an XML document with a thunk.
FIG. 18 is a client workspace with relevant coordinates for type-link drawing.
FIG. 19 illustrates an SVG XML display tag.

DETAILED DESCRIPTION OF THE INVENTION

Figure 1:
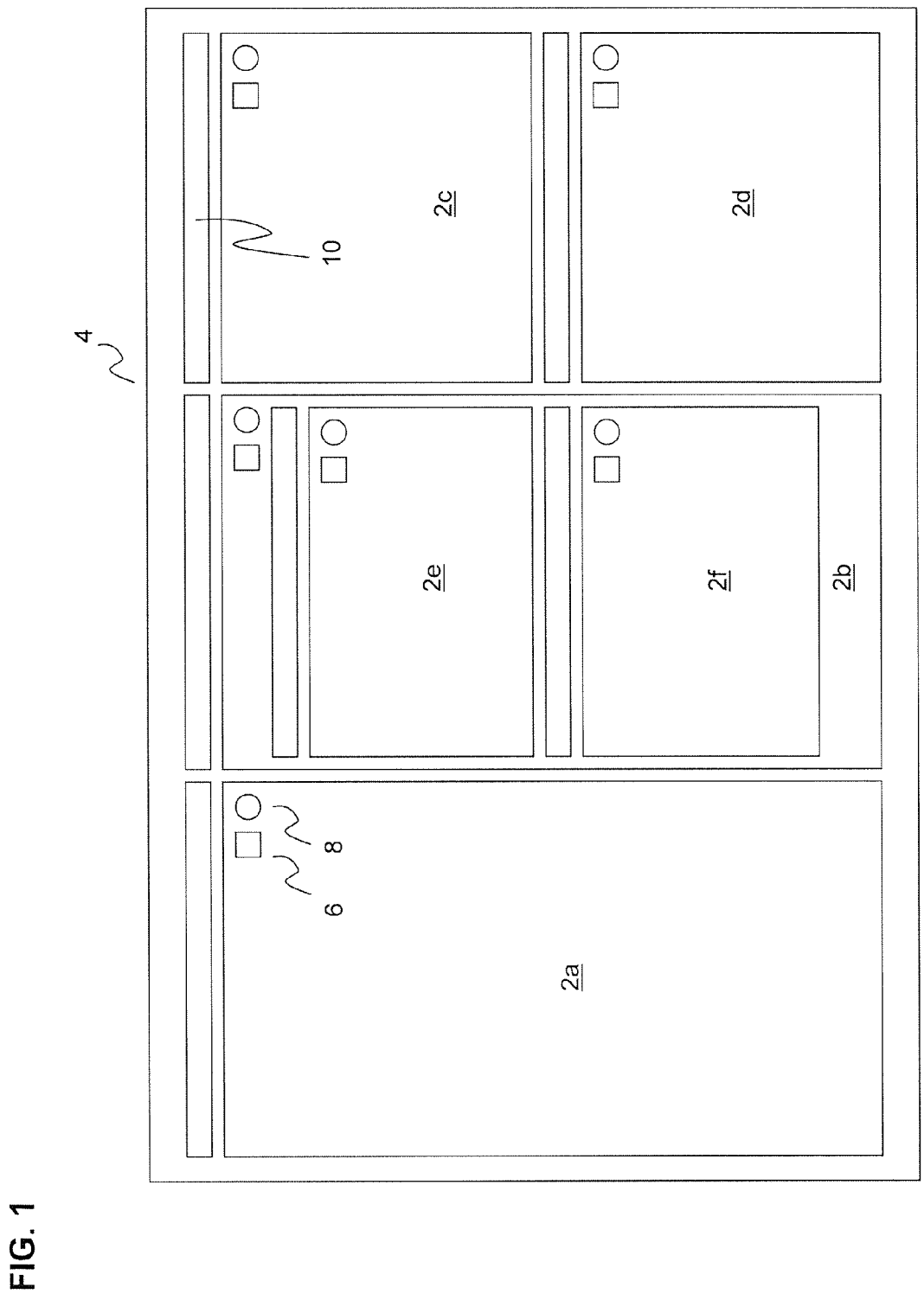
FIG. 1 illustrates a multi-pane layout for a browser.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made.

Embodiments described herein are designed to be used with a computer system. The computer system may be any computer system, for example, a personal computer, a mini-computer, or a mainframe computer. The computer system will typically include a processor, a display, at least one input device, and random access memory (RAM), but may include more or fewer of these components. The processor can be directly connected to the display, or remotely over communication lines such as telephone lines or local area networks. Embodiments may include both commercial off-the-shelf (COTS) configurations, and special purpose systems designed to work with the embodiments disclosed herein, so long as the hardware used is capable of performing the tasks required by specific embodiments.

FIG. 1 shows the multi-pane 2a-2f layout of a web browser 4 or other browser type interface (e.g. an intranet browser). There are six panes 2a-2f shown in the browser 4. Panes 2a-2f can be tiled in any arrangement and number. An outline origination control 6, when clicked, clears the pane 2a-2f and begins the creation of an outline. A pane removal control 8 removes a pane 2a-2f from the browser 4 and causes adjacent panes 2a-2f to expand in size to fill the gap left by the removed pane 2a-2f. The divider and sizing bar 10, when selected, allows for dividing panes 2a-2f to create new panes 2a-2f, and also for dragging panes 2a-2f to both re-arrange and re-size them.

Each pane 2a-2f can display one of several objects. Most commonly, these objects include objects normally displayed in a typical web browser. For example, html and related objects, images, media, and tables. Any other objects, however, also can be displayed. When a pane 2a-2f displays objects normally displayed in a web browser, the objects are displayed as they would appear in any web browser. A pane 2a-2f can also contain any html-like formatted object that can be reformatted by a Cascading Style Sheet (CSS) reformatter to better fit the shape provided. When reformatting has occurred, a format control is included at the top of the pane 2*a*-2*f* to toggle between the reformatted object and the original object layout. The function enabling selection between the reformatted object layout and the original object layout when displaying the object in a pane 2*a*-2*f* allows for flexible importation of web objects. For additional flexibility, each pane 2*a*-2*f* has its own "larger" and "smaller" display text commands.

A pane 2*a*-2*f* may contain an additional pane 2*e* or panes 2*e*, 2*f*. Panes 2*e*, 2*f* located within another pane 2*b* are sub-panes 2*e*, 2*f*. As the ability for a pane 2*b* to have multiple sub-panes 2*e*, 2*f* indicates, a sub-pane 2*e*, 2*f* is not required to fill the entire space of the pane 2*b* it is housed within. A pane 2*b*, for example, can have sub-panes 2*e*, 2*f* that are windowed, or tabs as methods to place multiple sub-panes 2*e*, 2*f* within a pane 2*b*. Alternatively, in certain embodiments, a pane 2*a*-2*f* will be able to display an entire web page, as if it were a HyperText Markup Language (HTML) frame.

Figure 2:
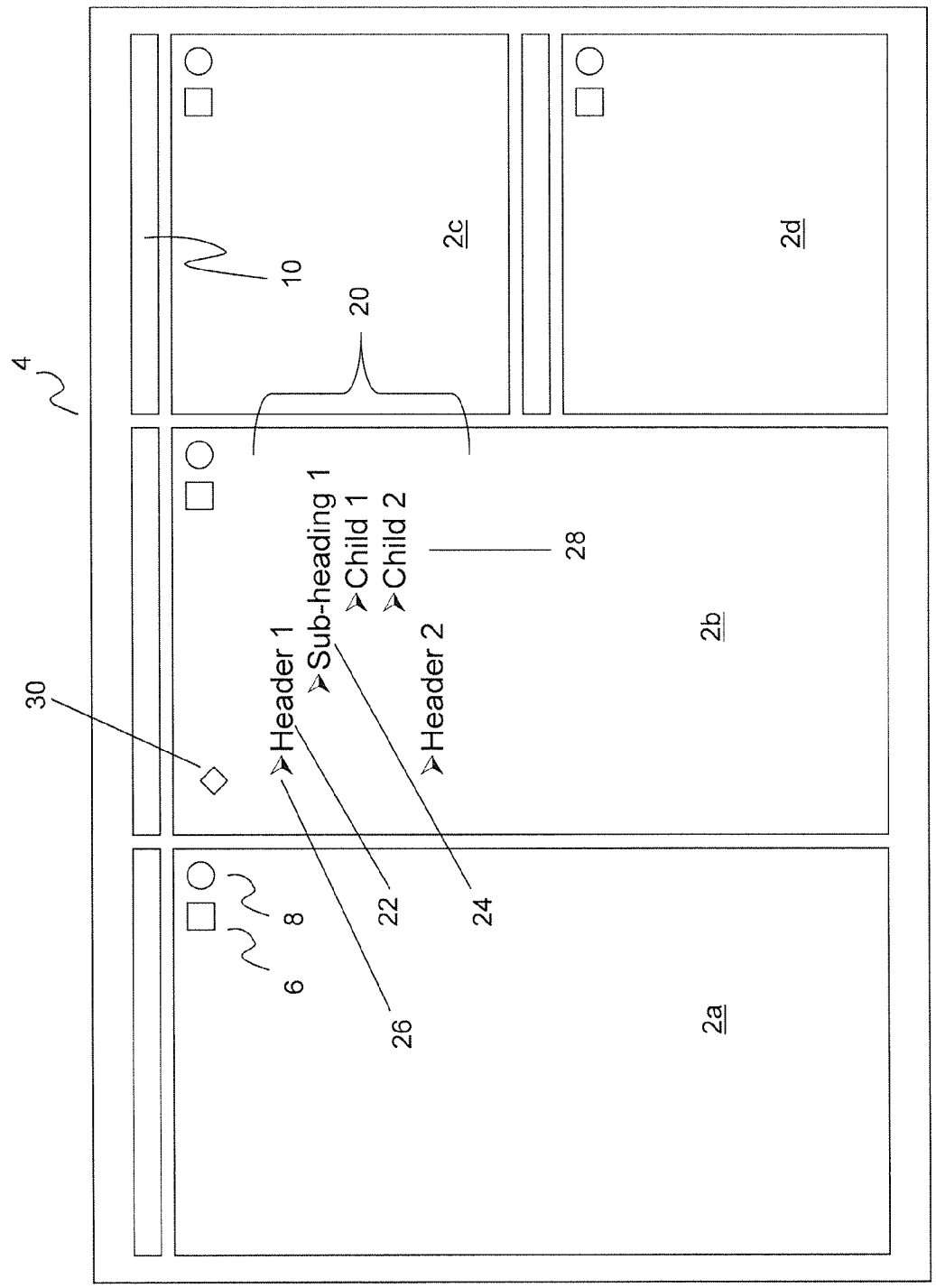
FIG. 2 illustrates an outline within a pane.

Referring now to FIG. 2, one of a pane's 2*a*-2*f* primary purposes is to display an outline 20 object. An outline 20 object is internally represented as eXtensible Markup Language (XML), and is presented in the pane 2*a*-2*f* as an outline 20. An outline 20 can be placed within a pane 2*a*-2*f* in one of three ways. First, a user may import a saved outline 20 that has been previously created, or that otherwise conforms to an XML import standard. Second, as presented previously when discussing the user interface's ability to reformat certain html-like objects, a reformatter can format certain structured XML documents or data into outlines 20. Third, an outline control origination 6 can be activated to clear a pane 2*a*-2*f* and begin the creation of an outline 20.

The outline 20 supports known outliner conventions such as editing a header 22. A header 22 may be any eXtensible HyperText Markup Language (XHTML) object, for example, an image. A sibling header—a header below and at the same level of indentation—or a child header 24—a header below and indented—may be created. Headers 22, 24 can be promoted (moved left) and demoted (moved right). They may be moved up or down, or dragged anywhere, including to outlines 20 in other panes 2*a*-2*f*. The display characteristics of a header 22, or a child header 24 can be altered by clicking the header expansion control 26 (pictured as an arrow) which changes orientation based on what display characteristics are presently activated. For example, if children exist and are collapsed, a header 22, 24 has a header expansion control 26 (pictured as an arrow) oriented to the right. If no children exist, the header 22, 24 has a childless indicator 28 (pictured as a bullet).

Figure 3:
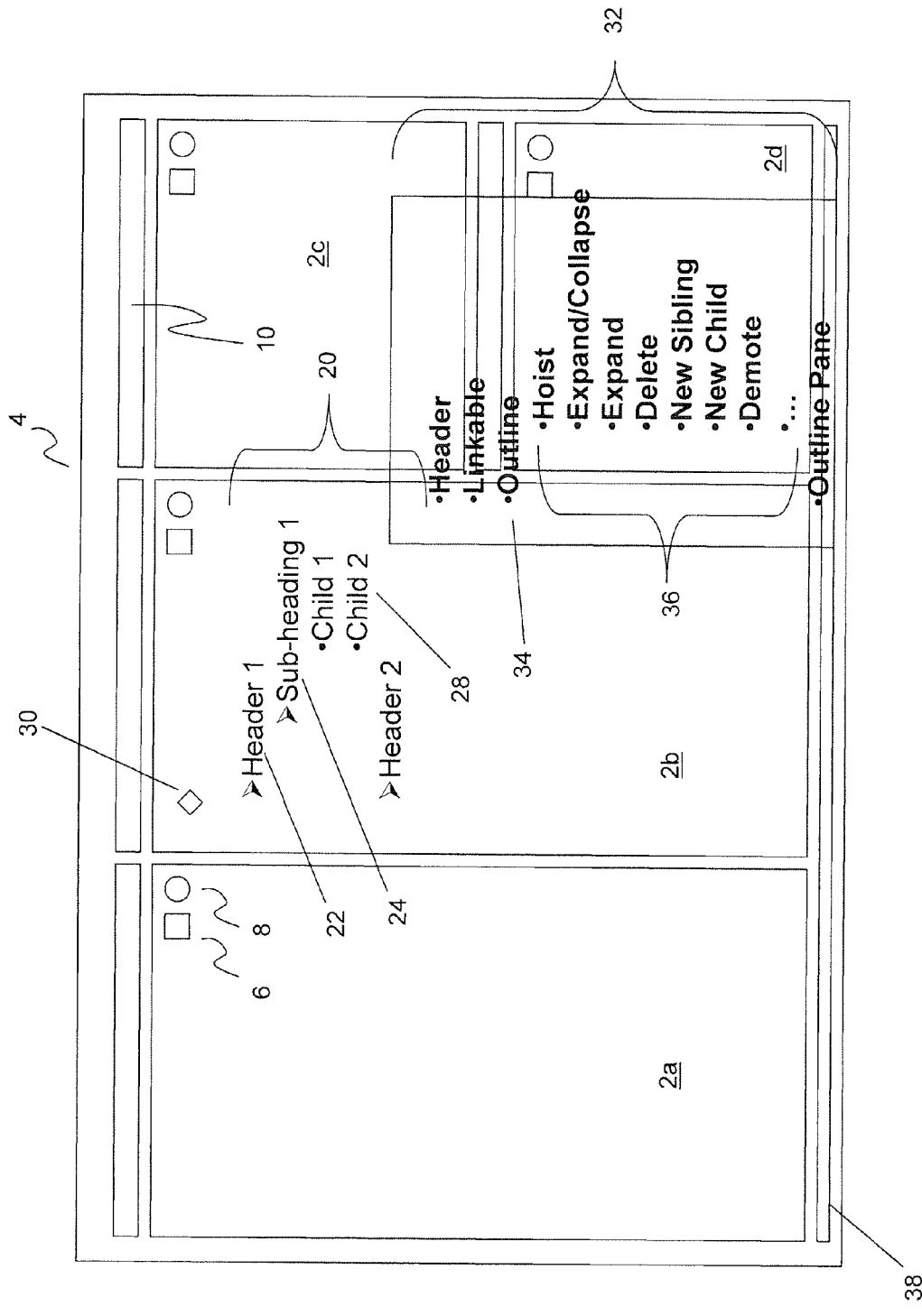
FIG. 3 illustrates a context control menu.

Any header 22, 24 can be made the root (or top parent) in the display by hoisting the outline 20 through a user-defined key combination, or by accessing the context control menu 32 (FIG. 3). Hoisting the outline 20 allows a user to zoom into, and focus on, the hierarchy of the outline 20 which has been selected. A header 22, 24 is hoistable to any existing, or new pane 2*a*-2*f*. Once a header 22, 24 of an outline 20 has been hoisted, a hoist indicator 30 is visible at the top of the outline 20. Selecting the hoist indicator 30 (represented as a diamond) de-hoists the header 22, 24 and allows the user to view the portion of the outline 20 previously being viewed. Depending on the size and complexity of the user's outline 20, multiple hoists, or de-hoists, may be required to access the portion of the outline 20 the user is interested in. By opening and closing headers 22, 24, and hoisting and de-hoisting these headers 22, 24, a user can focus on specific data within a huge array of related data while retaining context.

Numerous methods exist for controlling the outline 20. First, the outline 20 may be controlled exclusively by the keyboard input device of a computer. Second, the outline 20 may be controlled by interactions between the browser 4 and a cursor controlling device that directly grabs and drops elements of the browser 4. Finally, the outline 20 may be controlled by a context control menu 32 (FIG. 3) that is presented when a user right-clicks a cursor controlling device.

Referring now to FIG. 3, when a user brings up the context control menu 32 at any point in the screen, the user is presented with an outline 20 presentation of each of the elements the user may be targeting. Moving a cursor over the desired interaction element 34 of the outline 20 brings up a list of potential actions 36. Potential user actions 36 may be assigned with a common triggering interface, or alternatively each may be assigned with individual triggering interfaces. For example, a "Hoist" may require dragging an element with a cursor controlling device, while "Expand/Collapse" may require clicking a cursor controlling device, or using a function key. Individual triggering interfaces are signified to the user with a cursor icon change. Further, the context menu 36 allows the user to set default actions. For example, left-click dragging could be set by the user to make a type-link, move an element, or hoist, etc. Also, there is a dockable status bar 38 on the bottom of the browser 4 that that will always show with icons and text the actions that are available wherever the cursor is located. Alternatively, the dockable status bar 38 can be configured to work like a tooltip, where selection of certain icons enables the conduct of certain actions within the browser 4. The dockable status bar 38 allows the novice user to gain familiarity with the user interface.

Figure 4:
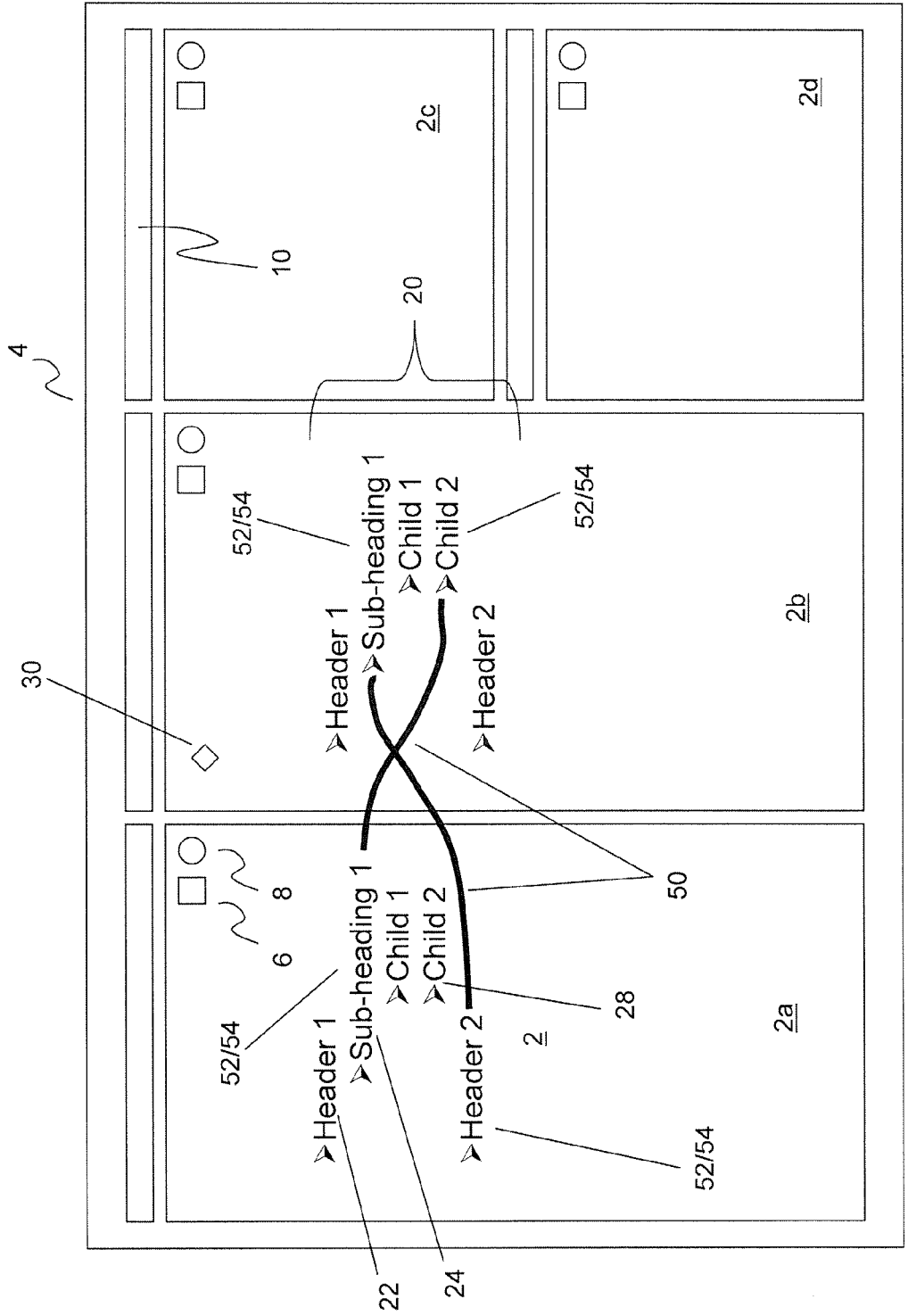
FIG. 4 illustrates a browser with type-links.

Referring now to FIG. 4, the browser 4 also supports type-links 50. A type-link 50 is a logical connection between a source element 52 and a target element 54. A source element 52 and target element 54 may include any element, including, but not limited to, headers 22, 24 of outlines 20, or even another type-link 50. In one embodiment, a type-link 50 is created by dragging from a source element 52 to a target element 54. Typically a source element 52 and a target element 54 are in separate panes 2*a*-2*f*, but they may be in a single pane 2*a*-2*f*. Other type-link 50 creation methodologies are available, including use of a function key, a touch screen drag, typing in a control term, or right clicking on a menu to designate linkage between source and target. If a type-link 50 creation dragging operation is to terminate in an element that is collapsed, hovering the cursor over a header expansion control 26 (represented by an arrow in FIG. 2) will open the outline 20 to allow the target element 54 to be exposed.

The type-link 50 is created when it is "dropped" on the destination. A type-link 50 menu appears with the potential type-link 50 categories based on the characteristics of the source element 52 and target element 54 of the type-link 50. The potential type-link 50 categories may also be based on the characteristics of the pane 2*a*-2*f*, or panes 2*a*-2*f*, housing the source element 52 and target element 54. The type-link 50 menu shows all allowable type-link 50 types, deducing what is possible and sorting, from top to bottom, the user's most likely choice to the user's least likely choice, anticipating the user's intent by tracking those type-links 50 most recently selected based on the characteristics of the pane 2*a*-2*f* or panes 2*a*-2*f*, and also on the source 52 and target 54 elements. If one of the menu-offered type-links 50 is selected, the user may specify further type-link 50 parameters and constraints. For example, if a type-link 50 is of the type "was in location," relevant parameters may include "how long" and "how long ago," with the "how long ago" parameter updating with the passage of time.

As with panes 2*a*-2*f*, a large variety of relation types are supported. If there is no satisfactory choice, the type-link 50 menu supports the modification of an existing type-link 50, or the creation of a new version of a type-link 50 based on the rules of categorization of the system.

A type-link 50 is represented in the user interface by a graphical line with a user-definable color designating the type. Other styling features are also available for user definition. These include, but are not limited to, line style (dotted, dashed), line thickness, line transparency, glow/shadow, and arrowheads. Criteria a user may associate with these line characteristics include, but are not limited to, type-link 50 type, type-link 50 author, type-link 50 creation date, type-link 50 modification date, type-link 50 priority, and type-link 50 relationship to other type-links 50.

If a type-link 50 has previously been created, a user may hover a cursor over the existing type-link 50 and a popup appears to allow for re-assigning type-link 50 type. The user may also hover a cursor over a type-link 50 to see the specific information associated with the type-link 50 in a statement that includes both the source element 52, the target element 54, and the relationship established by the type-link 50 with user-added parameters. For ease of manipulating type-links 50, a type-link 50 viewing mode will be available through a user action such as, but not limited to, holding down a specified key. In this type-link 50 viewing mode, type-links 50 move to the forefront of the screen where they can be selected, modified, and deleted.

Accessing the type-link 50 viewing mode may be necessary because type-links 50 are ordered to ease a user's ability to identify and distinguish between multiple type-links 50. By default, type-links 50 appear below the main elements (outline 20 text has a semitransparent background to allow readability while still being able to see type-links 50 behind it) and above elements that are not the user's focus such as the separators between panes. Additionally, the system's ability to handle such large volumes of diverse type-links 50, makes the ability to filter type-link 50 display essential. Type-link 50 display may be controlled by a simple checkbox associated with a type-link 50 list, allowing a user to determine which type-links 50 are displayed. Additionally, type-links 50 may be displayed in their own outline 20. For example, an outline 20 of type-links 50 could show all type-links 50, type-links 50 filtered by category, type, or most recently created. Such an outline 20 of type-links 50 would be editable by a user.

In addition to sheer volume of type-links 50, display of type-links 50 is further complicated by the ability of either the source element 52 or target element 54, or both the source element 52 and the target element 54 of the type-link 50 to not be visible from the user's current vantage point within the user interface. A type-link 50 may not be displayed because a zone of the pane 2a-2f has been scrolled out of the visible zone, because the type-link's 50 source element 52 or target element 54 is a collapsed portion of an outline 20, or because the source element 52 or target element 54 is in a pane 2a-2f not currently displayed. In cases where one end of a type-link 50 is visible, the text or object is highlighted by a color to indicate the presence of a type-link 50.

Figure 5:
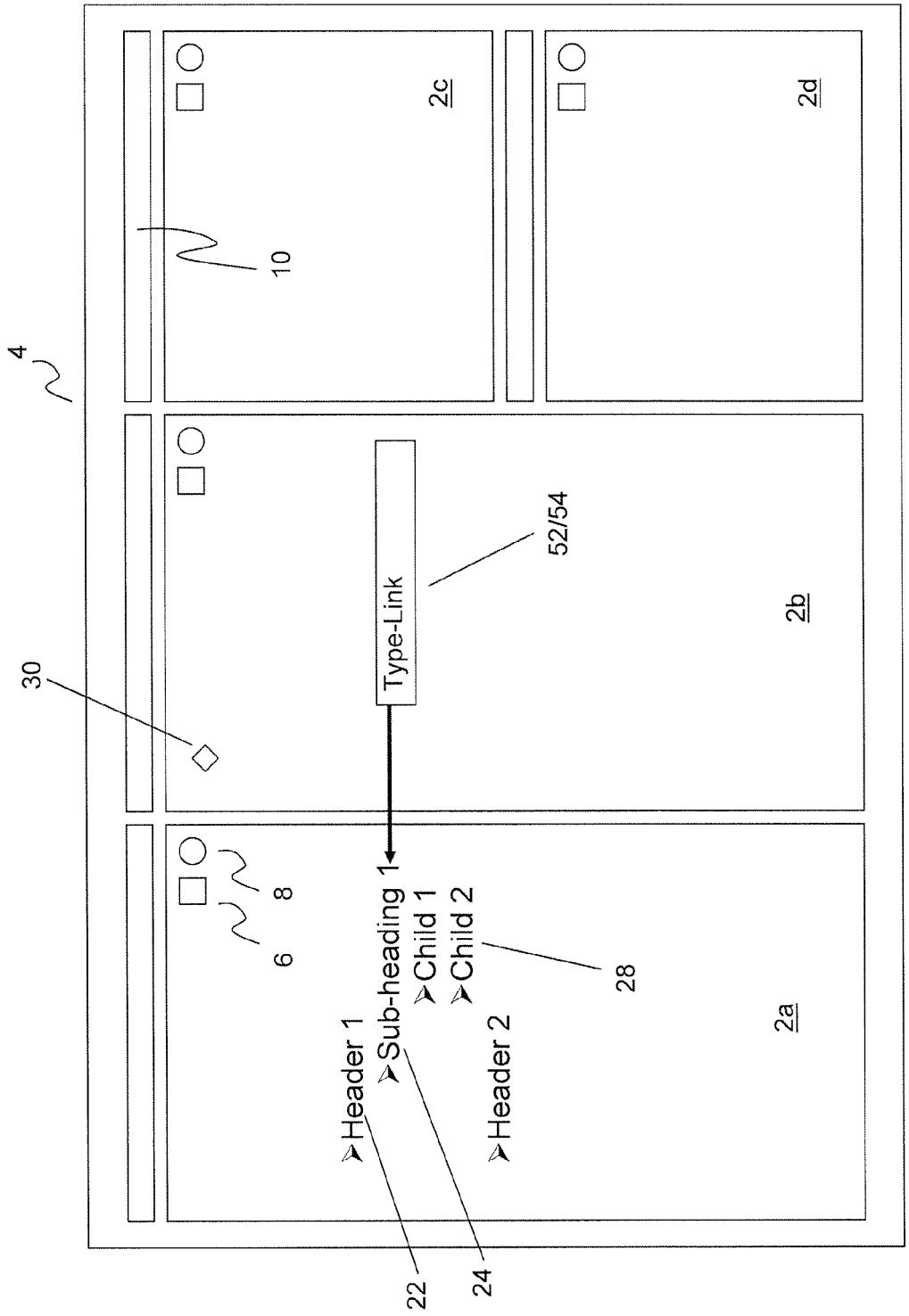
FIG. 5 illustrates a browser with a non-visible type-link.

In cases where multiple type-links 50 exist at a visible source element 52 or target element 54—and at least two have been selected to be visible—the user can select to have a multicolor view or a grey highlight which will be expanded by hovering a cursor. In the case where only one of a source element 52 or target element 54 is visible, the other end of the type-link 50 can be seen by selecting the visible source element 52 or target element 54 of the type-link 50. The result of this selection, shown in FIG. 5, is that the other end of the type-link 50 which is not in a visible pane 2a-2f is displayed. Clicking on the exposed type-link 50 to a non-visible pane 2a-2f opens and displays the full type-link 50 and may load a new pane in certain circumstances which have been defined by the user. In this example, the type-link 50 is to a non-visible pane 2a-2f, but the same display is capable of being retrieved by selecting a visible portion of the type-link 50 for source elements 52 or target elements 54 that are in a pane 2a-2f that is currently displayed, but the source element 52 or target element 54 is collapsed under a header 22, 24.

Figure 6:
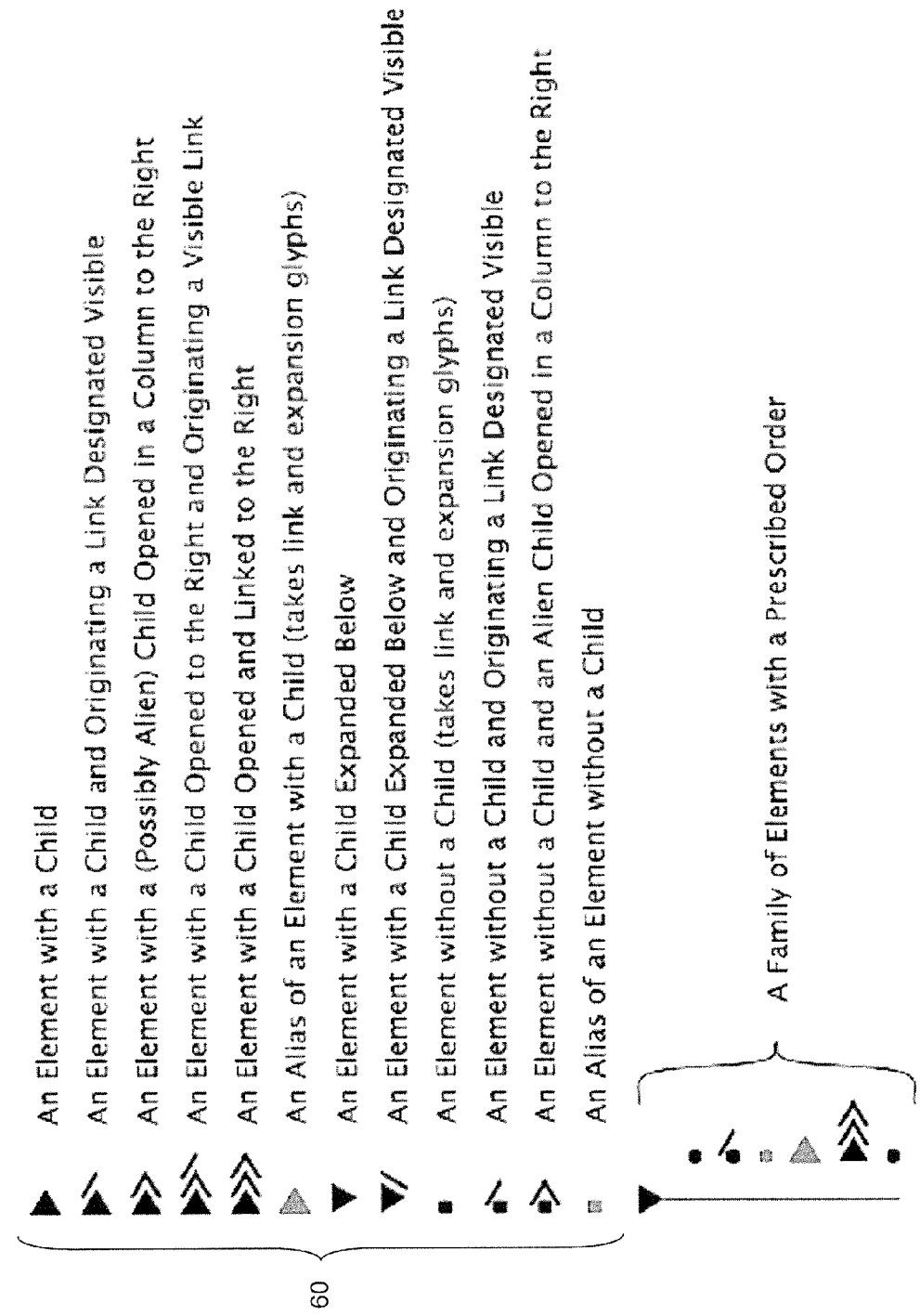
FIG. 6 illustrates type-link indicators.
Figure 7:
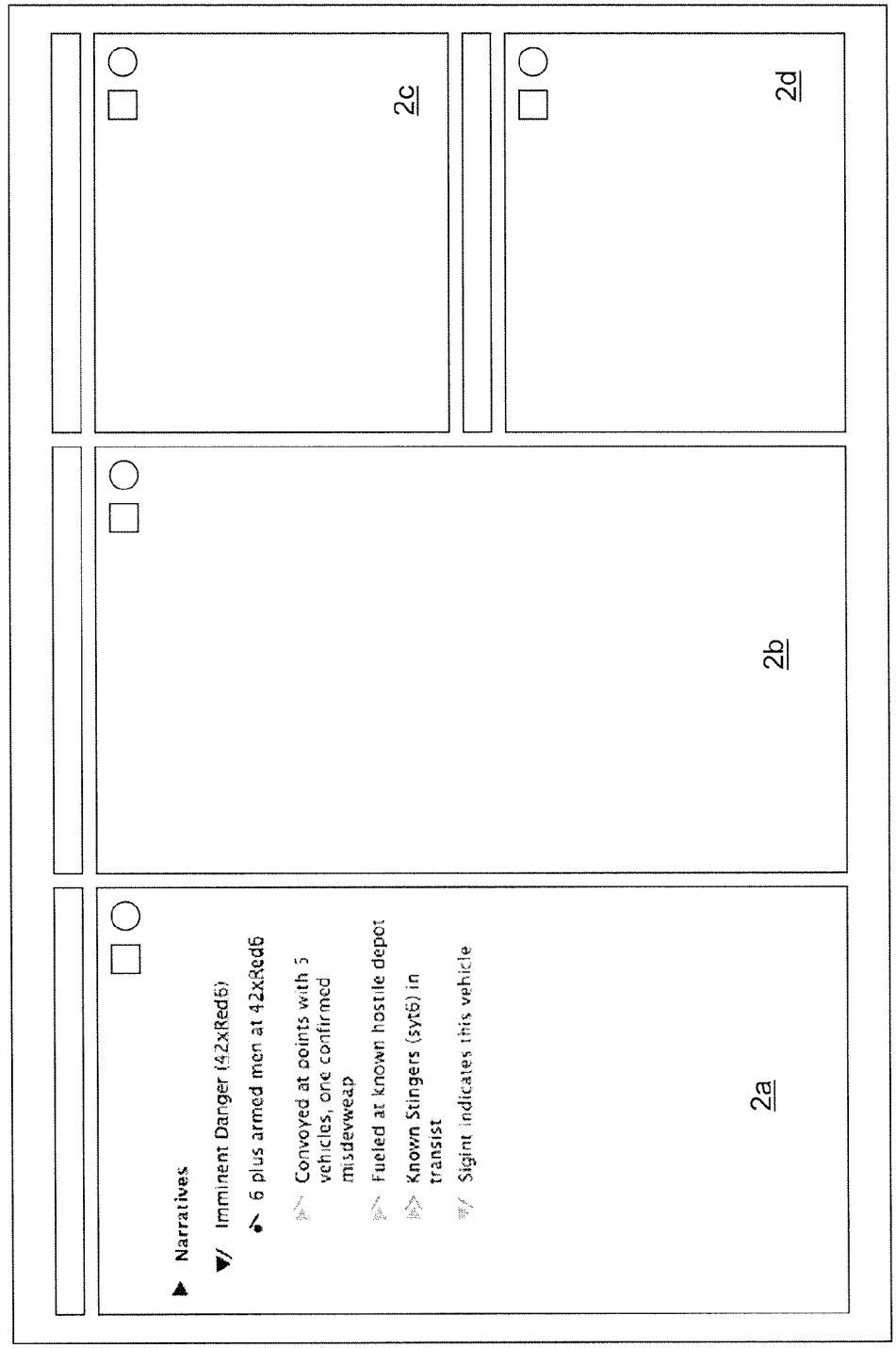
FIG. 7 sets forth an implementation of type-link indicators.

Referring now to FIG. 6, in cases where neither end of a type-link 50 (FIG. 4) is visible, a system of type-link indicators 60 (FIG. 6) are used. FIG. 6 shows a candidate vocabulary of such type-link indicators 60. This set can be used at the beginning of the line, the end of the line, or a colored line under a source element 52 or a target element 54 with a hidden type-link 50 could be used to indicate presence of a type-link 50 where neither the source element 52 or target element 54 are visible. In FIG. 6, the term "Alien" refers to a type-link 50 that goes to an un-displayed panel. FIG. 7 is one example implementation of the type-link indicators 60 in use with the user interface.

The combination of features necessary to provide the capability described above can only be realized by a unique approach to browser 4 development. A traditional dataflow model is programmed using a directed graph where nodes represent transformations and arrows represent data pathways. In the traditional model, when inputs change the data is reprocessed and new outputs are produced. Consequently, changes are immediately propagated through the directed graph.

The augmented dataflow model of the present system has two additional features not present in the traditional dataflow model. The first additional feature is that data is also code because the eXtensible Stylesheet Language (XSL) is valid eXtensible Markup Language (XML). XSL is used as a transformation language to allow for describing how elements—which are encoded in the XML standard—are to be formatted or transformed. The use of XSL with the present system allows for both higher order functions and code rewriting capabilities.

An example of data also serving as code are the previously presented type-links 50. For type-link 50 to achieve its full functionality it is represented within the system as XML. As a result of being represented within the system as XML, type-links 50 can be processed by XSL transformations 130 (FIG. 11) as easily as any other form of XML data. This enables a type-link 50 to become a component of a composite type-link 100 (FIG. 8).

Figure 8:
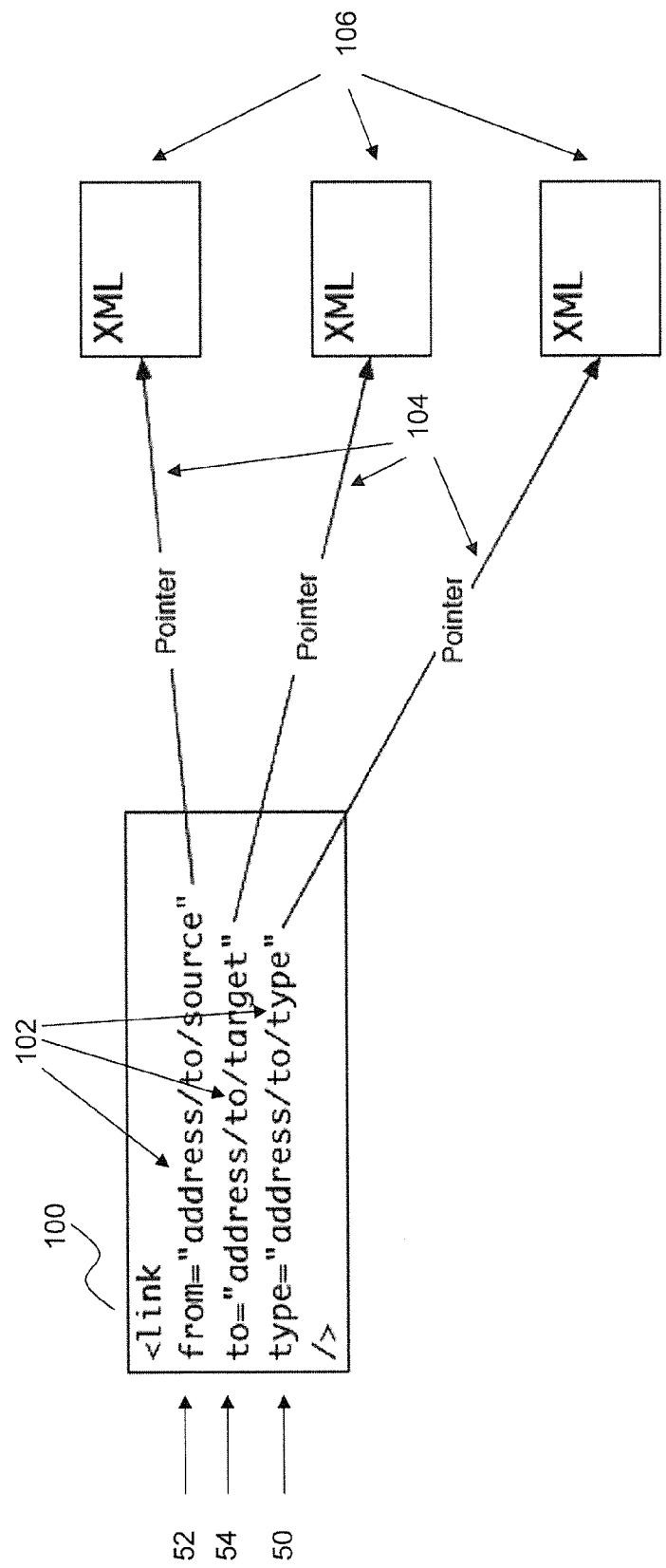
FIG. 8 illustrates a primitive composite type-link.

Referring now to FIG. 8, a primitive composite type-link 100 has three components: the source element 52, the target element 54, and the type-link 50. Each of these components is represented as an address string. An address string 102 is a pointer 104 to a specific XML node 106. The type-link 50, like the source element 52 and the target element 54, is specified as a pointer to an XML, node 106, allowing the link-type 50 characteristics to be extended. More complex composite type-link structures are built from strings of primitive composite type-links 100. The type-link 50, as a result of being represented by XML, can serve to chain together multiple primitive composite type links 100. Complex composite type-link structures can be created which represent relationships between more than just a source element 52 and a target element 54. Instead, intermediate elements can exist between the ultimate source 52 and ultimate target 54. These intermediate elements, however, are also source elements 52 and target elements 54 for at least one type-link 50 within the more complex composite type-link structure.

Although the combined use of XML and XSL allows type-links 50 to be treated as any other XML data, a separate type-link cache exists in the kernel for retrieving all the type-links 50 from or to a given element. This cache exists for programmer convenience and performance benefits. The type-link cache contains an automatically updated collection of type-links 50 that the client is aware of. This link cache is also fully reactive, so when a type-link 50 changes, or a new type-link 50 is created, the type-link cache updates, as do any transformations that depend on the updated type-link 50. The system has many type-links 50, but the kernel's type-link cache only contains those type-links 50 that the user has loaded—either from embedded type-links 50 within a document or from type-link 50 repositories delivered by the server—and type-links 50 that the kernel and user interface create for their own internal use. These internally-created type-links 50 include, for example, dependency links 110 (FIG. 9), and binding links 120 (FIG. 10). Dependency links 110 (FIG. 9) are type-links 50—implemented by a thunk—created to instruct the kernel to transform elements dependent from a changed element, Binding links 120 (FIG. 10) are type-links 50 to XML trees which contain the names of commands and the code to perform them. Binding links specify internal behavior of the system, and are also used to create the context control menu 32 (FIG. 3).

The second additional feature that the augmented dataflow model of the present system has that is not present in a traditional dataflow model is that the data which is output by an XSL transformation 130 (FIG. 11) is capable of undergoing additional transformations. This capability is offered by an XML element which allows for delayed evaluation called a "thunk." This system implements reactive thunks which are re-evaluated when inputs to the thunk change. Reactive thunks have attributes which are addresses to XML elements. The use of reactive thunks allows the kernel, upon encountering a thunk, to evaluate the thunk's specified function and then replace the thunk with the XML code that results from the function's execution. Although the thunk is replaced by the XML resulting from the function's execution, the thunk is also saved to allow for future propagation of changes when either inputs or functions are changed.

When a change is made to a root element (such as an XML attribute being modified, or an XML element being inserted into a tree), the system will only re-compute the transformations that are dependent on the changed data. A change may involve a dependency which requires only a single recursion because only a single XML element is involved. Alternatively, a change may involve a dependency which requires a complex recursion where some or all of an XML element's dependents must also be transformed. In either case, thunks are created which instruct the kernel to transform the dependent elements when they are needed. A thunk is capable of specifying either a single-recursive transformation or a complex-recursive transformation, so that upon a change, the system—specifically the kernel—always knows which transformations will need to be re-computed.

The combined use of XSL and XML has additional advantages. Using XSL as the primary programming language for transformations (although JAVASCRIPT (™) may also be used), and XML as the data format, results in additional browser 4 functionality. Current web browser architectures implement a form of eXtensible Stylesheet Language Transformation (XSLT) processing. These implementations are faster than their equivalent JAVASCRIPT (™) code. Additionally, XML is a standard for both data interchange and web browser display. XML is capable of displaying information on a user interface in the form of both eXtensible HyperText Markup Language (XHTML) and Scalable Vector Graphics (SVG).

The augmented dataflow model of the present system is managed by a JAVASCRIPT (™) kernel. The kernel is responsible for propagating changes, requesting code and data, and evaluating transformations. The kernel uses a "lazy" evaluation strategy. Lazy, or delayed, evaluation forgoes a computation until such time as the result of the computation is known to be needed. By using lazy evaluation, code and data are pulled lby the kernel only when needed by the user. Expressed differently, until a thunk is needed, it will remain unevaluated. This is beneficial for web-based environments where bandwidth is a concern, as code and data will only be pulled from distant servers when needed. The JAVASCRIPT (™) kernel also uses a caching model which keeps track of computed transformations. When a thunk specifies a transformation that the kernel has already computed, rather than re-computing the transformation, the kernel uses the cached version.

The system is only forced out of its augmented dataflow model to execute a command necessitated by a user's actions. Commands are written in JAVASCRIPT (™) or, for convenience, a domain-specific XML language that is interpreted by JAVASCRIPT (™). A command will generally necessitate that some XML be updated, either on the server or in the workspace 114 (FIG. 9) which is used as the application's internal memory. XML updates necessitated by the user command are then propagated through the system by the kernel.

Figure 9:
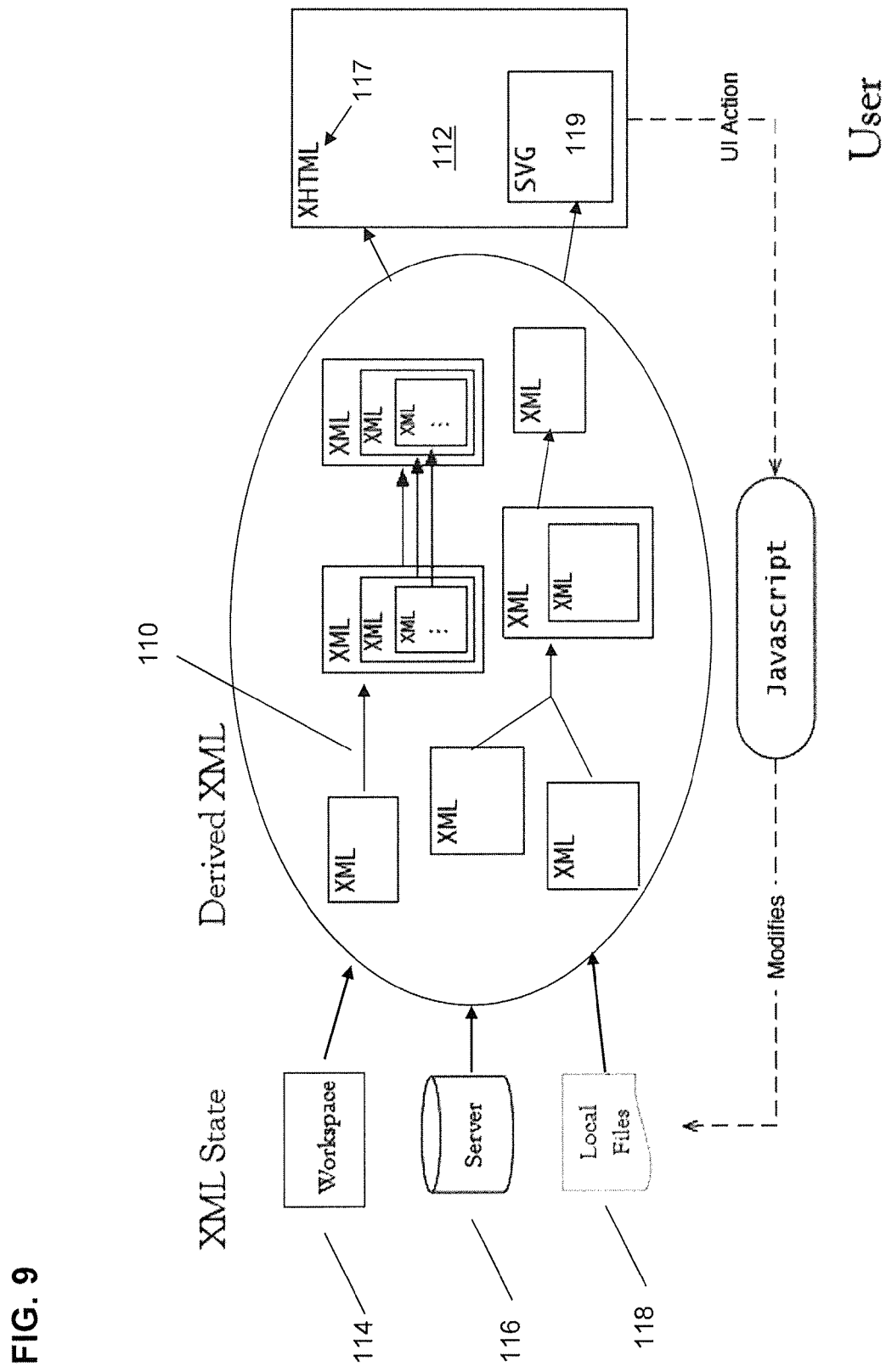
FIG. 9 is a diagram of the interaction of XML sources, XML transformations, and the impact of XML sources and XML transformations on the user interface.
Figure 10:
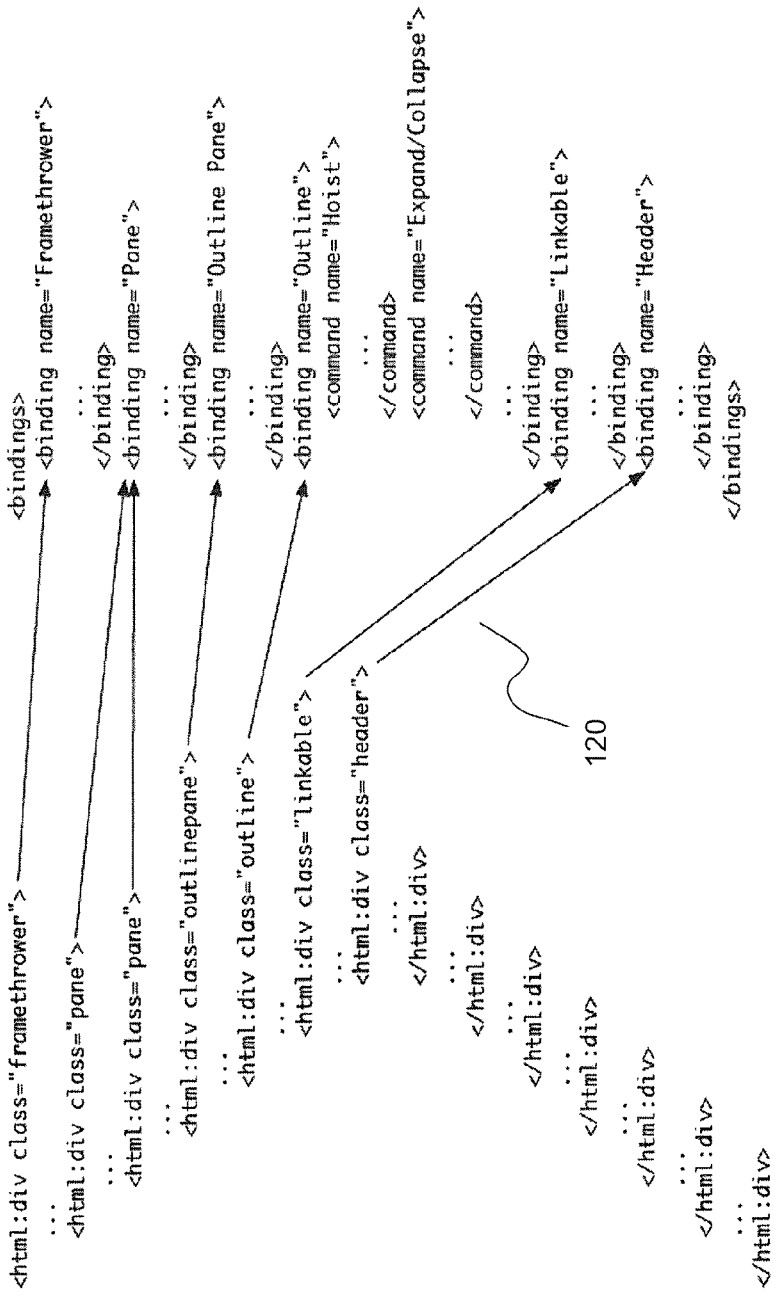
FIG. 10 is an example of binding links.

Referring now to FIG. 9, when the system is forced out of its augmented dataflow model to execute a user-necessitated command, it is usually because of actions taken by a user on the user interface 112. The user interface 112 is built on top of the kernel. Specifically, a series of XSL transformations 130 (FIG. 11) specifies how the data in the client's workspace 114, a server 116, and local files 118 gets translated into the XHTML 117 and SVG 119 present on the user interface 112.

In order for the system to be forced out of its augmented dataflow model to execute a user-necessitated command the system must "hear" the user. Event listeners are set up in javascript which capture all cursor controlling device and keyboard user interface 112 (FIG. 9) actions. When an event (for example, a keystroke) is triggered, a JAVASCRIPT (™) function starts at the target element and moves up the XHTML tree collecting any binding links 120 (FIG. 10). The JAVASCRIPT (™) function then cross-references the collection of binding links with an XML tree that stores default mappings between user interface actions and commands, to determine which command to perform.

FIGS. 12-15 illustrate how the user interface 112 (FIG. 9) uses certain kernel features. This example shows how a pane's 2a-2f (FIG. 1) display of outlines 20 (FIG. 2) is accomplished using internally-created connections, and also how XSL transformations 130 (FIG. 11) may produce XHTML 117 (FIG. 9) which appears on the user interface 112 (FIG. 9).

Figure 12:
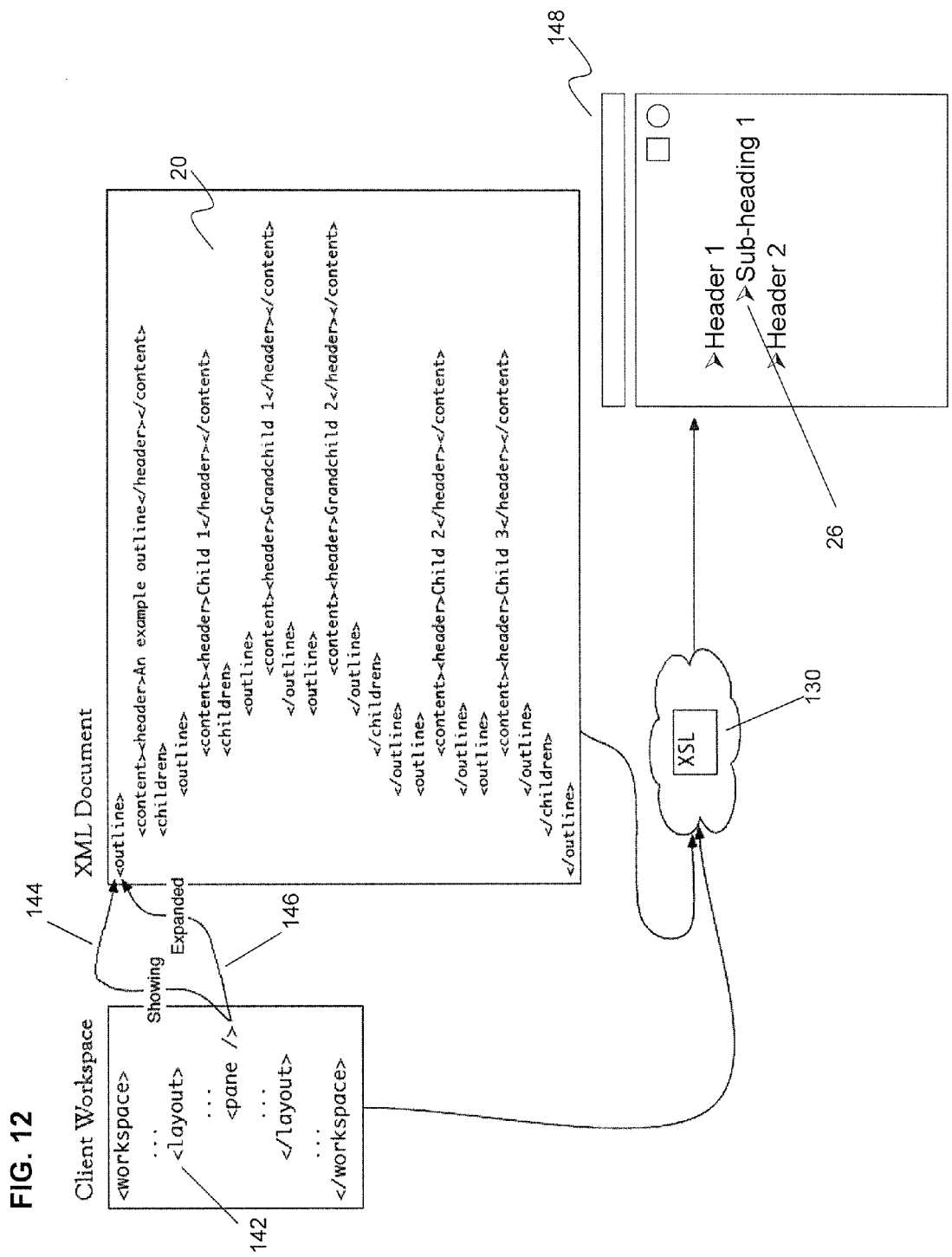
FIG. 12 illustrates a header being expanded or collapsed.
Figure 13:
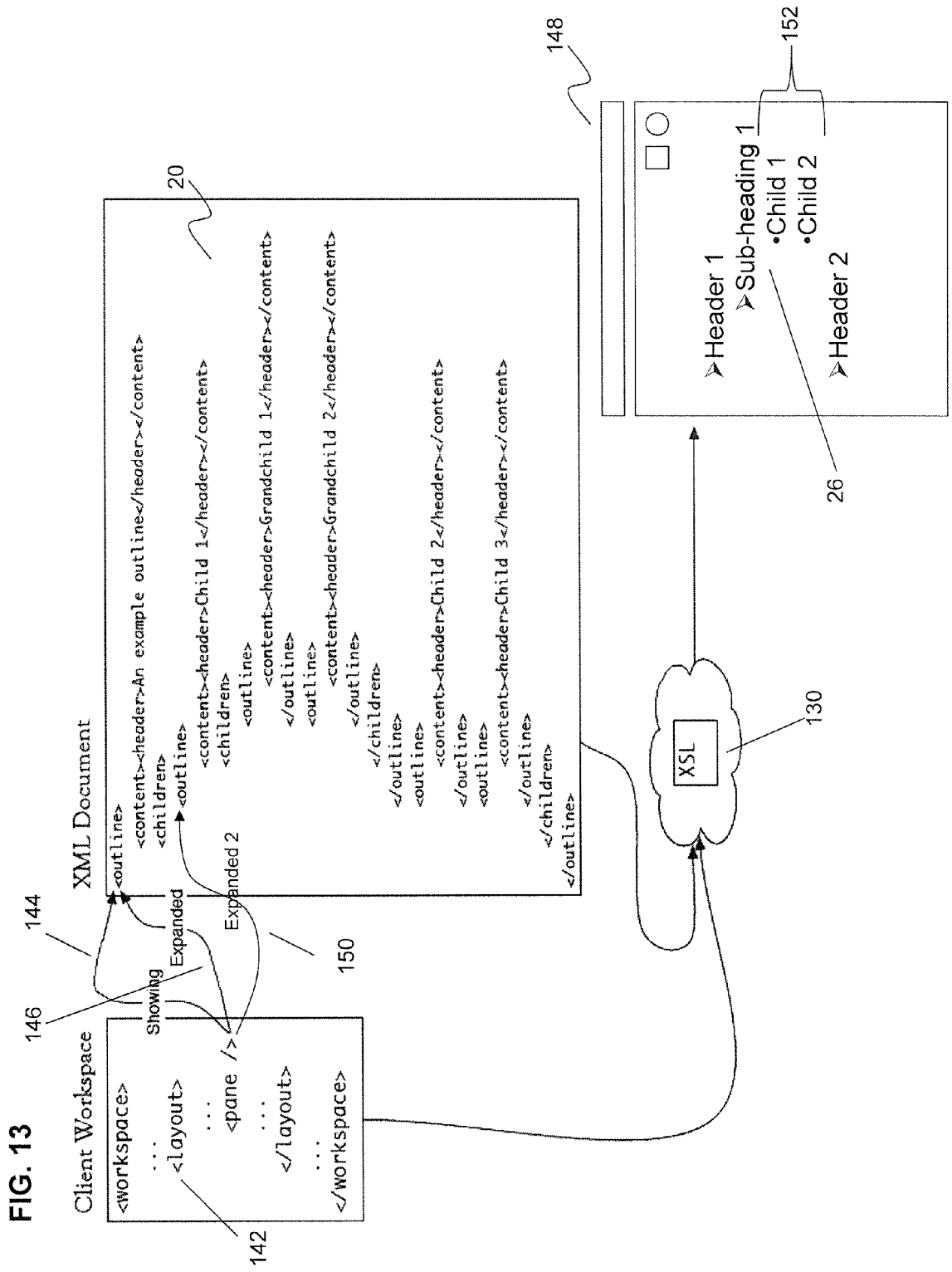
FIG. 13 illustrates a display of an expanded header.

Referring now to FIG. 12, within the client's workspace 114 (FIG. 9) is an XML tree called "layout" 142 which is the client's internal representation of the pane's 2a-2f (FIG. 1) organization. Each pane 2a-2f (FIG. 1) has a connection of type "Showing" 144 connecting it to the XML outline 20 that it is displaying. Additionally, for every expanded outline element in the pane 2a-2f (FIG. 1), there is a connection from the pane 2a-2f (FIG. 1) to the outline element of type "Expanded" 146. A series of XSL transformations 130 use the "layout" XML 142, the relevant document XML, and the relevant connections to produce the XHTML 117 (FIG. 9) resulting in a user interface output 148.

Figure 15:
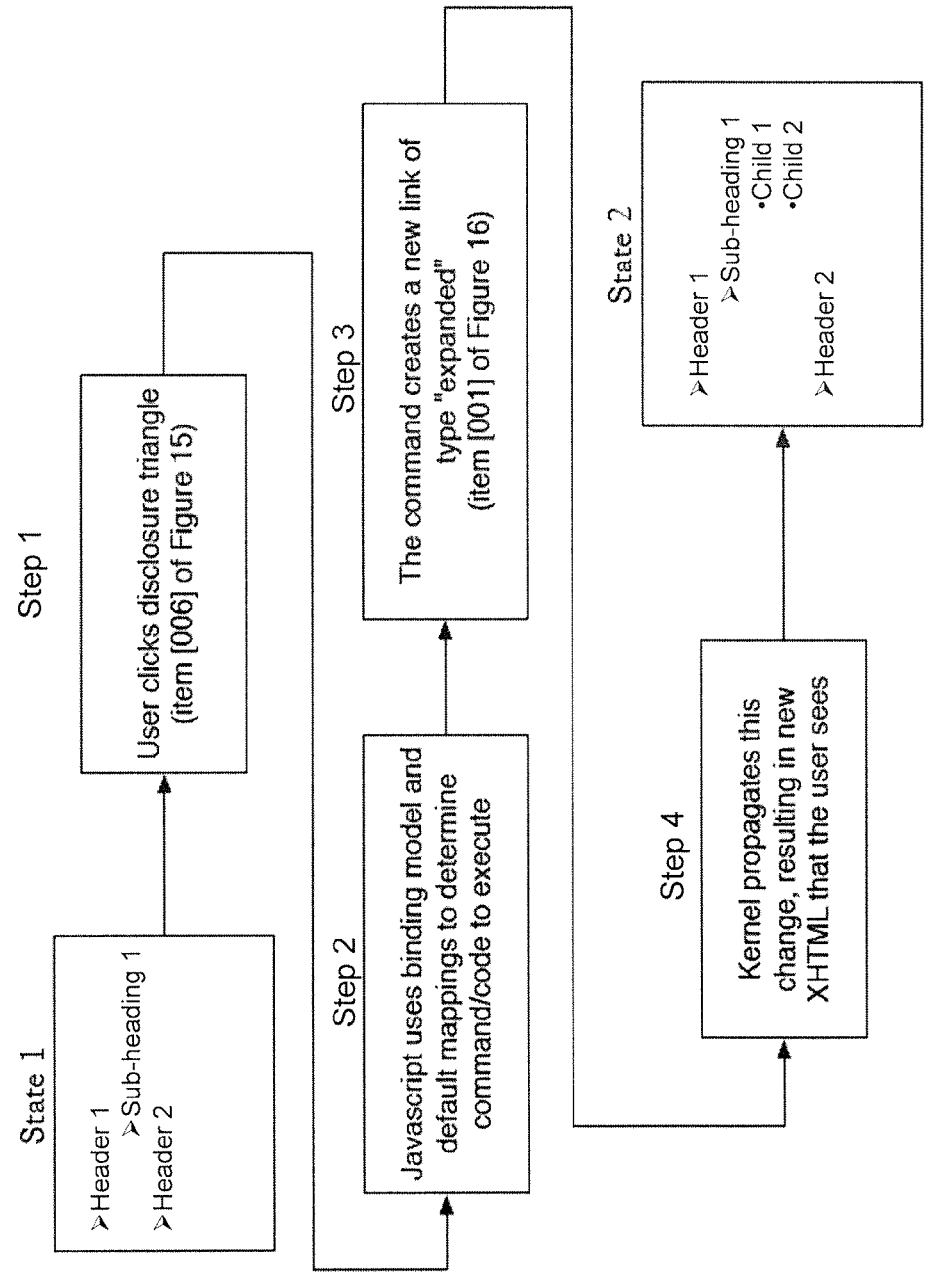
FIG. 15 is a flow chart showing the steps to header expansion.
Figure 16:
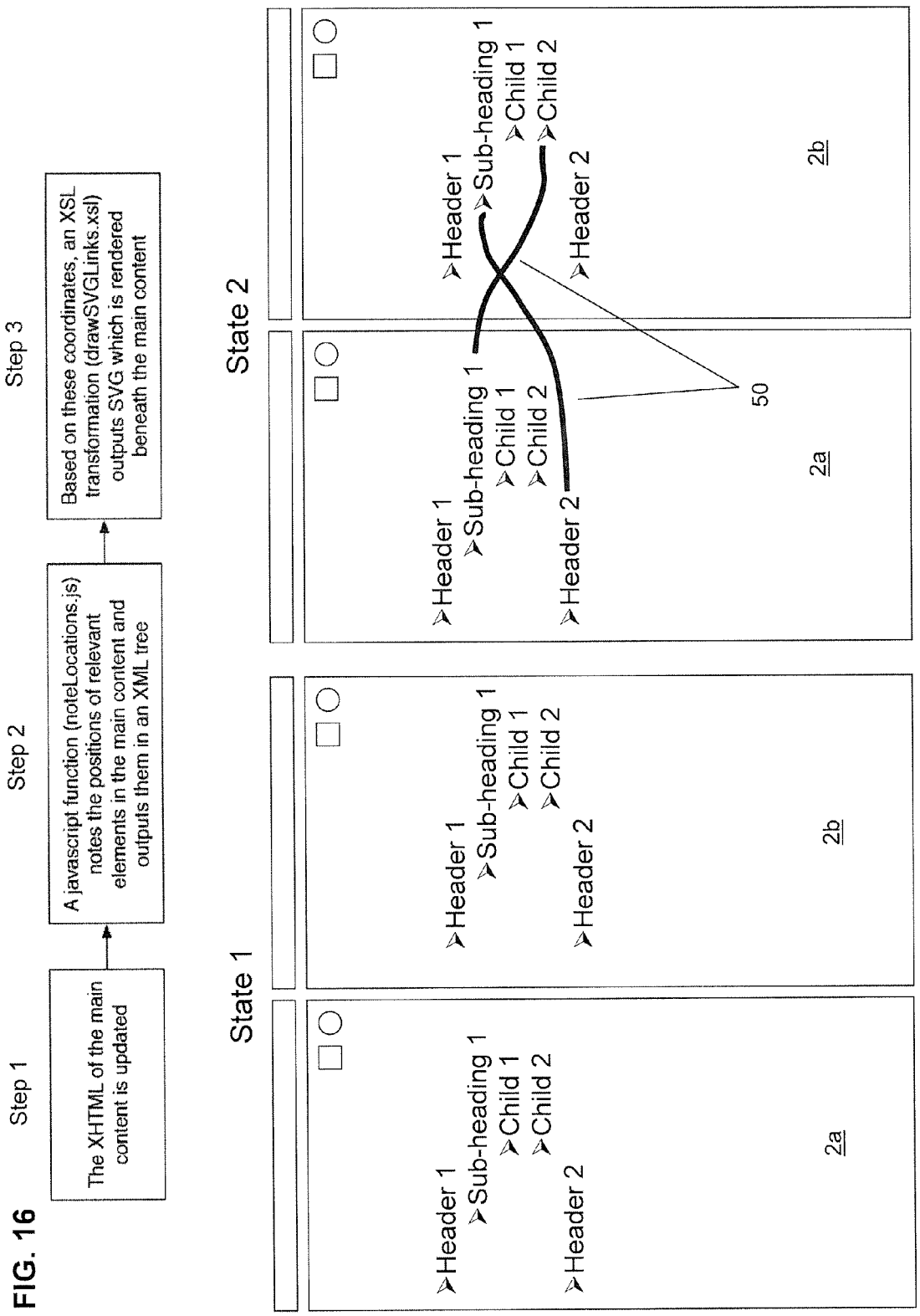
FIG. 16 is a block diagram of the link drawing process.
Figure 17:
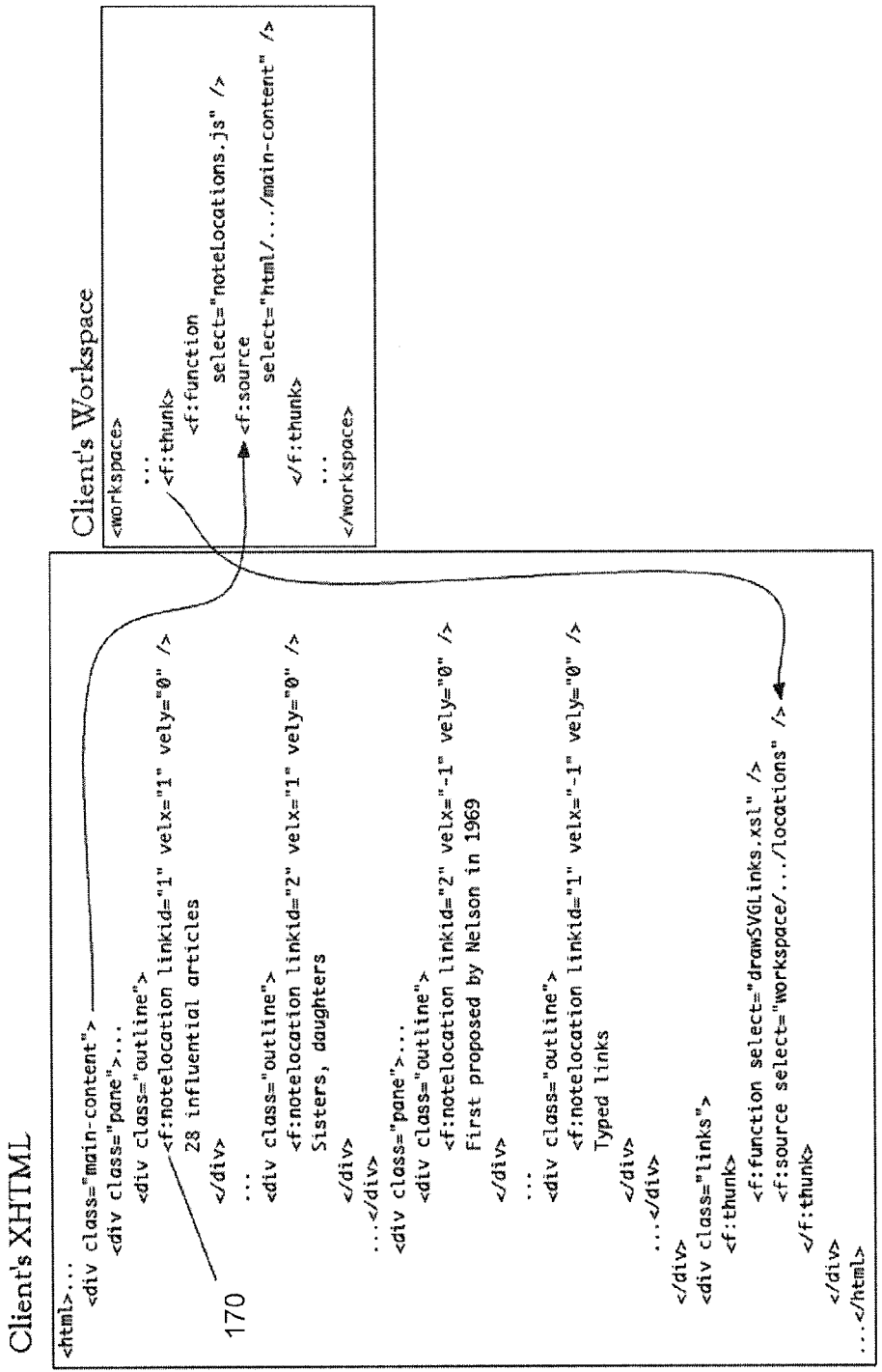
FIG. 17 shows XHTML displaying tags for drawing a type-link.

Referring now to FIG. 15, if a user selects the header expansion control 26 (represented as an arrow) of the outline element "Child 1" (STEP 1) the javascript event listener will hear the selection event, and based upon the binding links 120 (FIG. 10) of the binding model and the default mappings, will determine which command to execute (STEP 2). The command's code creates a new connection "Expanded 2" 150 (FIG. 13) (STEP 3). The kernel detects this change and re-computes any XSL transformations 130 (FIG. 11) that are affected by the change, specifically, the XSL transformations 130 (FIG. 11) that produce the user's XHTML 117 (FIG. 9). This results in an expanded user interface output 152.

In the previous example there were no unevaluated thunks, so lazy evaluation was not exploited. Referring now to FIG. 14, if a user was viewing the XML of FIG. 14 on the user interface 112 (FIG. 9), and "Child 1" of FIG. 12 is in its collapsed form, then as long as "Child 1" (FIG. 12) remains collapsed any thunks involving either "Grandchild 1" or "Grandchild 2" of FIG. 13 (expanded element 26) will remain unevaluated. Upon clicking the header expansion control 26 (FIG. 12) (represented as an arrow), however, the kernel recognizes it must evaluate the thunk 160 in order to produce the XHTML 117 (FIG. 9) to be displayed in the user interface 112 (FIG. 9).

Figure 11:
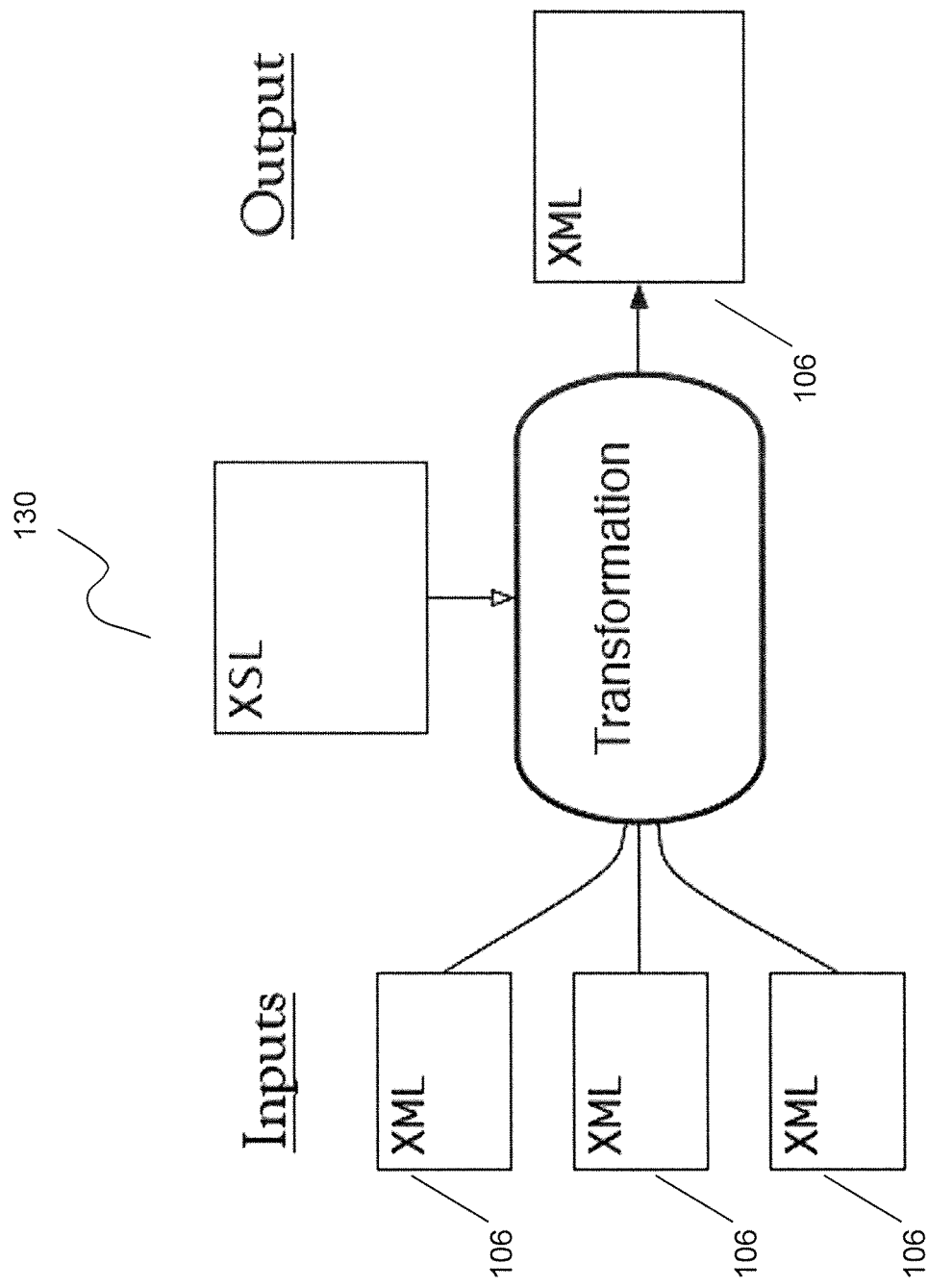
FIG. 11 illustrates an XSL transformation.

Referring now to FIGS. 16-19, another example of a user initiated command that will force the system out of its augmented dataflow model is the drawing of a type-link 50. The user sees an outline 20 that is drawn to the user interface 112 (FIG. 9) as XHTML 117 (FIG. 9). Transformations, in addition to being coded as XSL, can also be coded as pure JAVASCRIPT (™) (™) functions. The noteLocations.js transformation, is a pure JAVASCRIPT (™) function which takes as source the XHTML 117 (FIG. 9) of the main content, and uses the JAVASCRIPT (™) Document Object Model (DOM) to determine the x and y coordinates of relevant XHTML 117 (FIG. 9) elements. The XHTML 117 (FIG. 9) elements have been marked with special tags 170 by previous XSL transformations 130 (FIG. 11). These tags 170 also contain information used to draw the lines, specifically which line the location is a part of (attribute "linkid"), and the direction that the line should take (also used to determine the curvature of the lines), which is represented using attributes "velx" and "vely." This transformation is coded in JAVASCRIPT (™), because an XSL transformation 130 (FIG. 11) does not have access to the browser's 4 (FIG. 1) rendering information. Using the XHTML 117 (FIG. 9) as input, noteLocations.js produces an XML tree that contains the relevant coordinates 172. This information is then used by an XSL transformation 130 (FIG. 11), drawSVGLinks.xs1, to produce SVG XML 174. The curves of the type-link 50 are simply cubic Bezier curves, using SVG's path element. The user sees the main content, with the type-link 50 drawn behind it.

It should be noted that although embodiments have been described with specific references to specific examples of type-link 50 execution, the embodiments have broader applicability and may be used in systems designed for diverse fields, or specifically designed for uniform data sets within a specific field. For example, without limitation, embodiments may be used in conjunction with intelligence systems, maintenance management systems, human resources and personnel systems, and disaster management systems.

The above described embodiments provide a system that enables a user to organize diverse information in systems to convey a large and diverse collection of associations. The above description and drawings illustrate embodiments which achieve the objects, features, and advantages described. Although certain advantages and embodiments have been described above, those skilled in the art will recognize that substitutions, additions, deletions, modifications and/or other changes may be made.

What is claimed as new and desired to be protected by Letters Patent of the United States is:

1. A method for organizing diverse data within a computer processing environment comprising:

entering diverse data into a computer processing environment;

forming a plurality of composite type-links, the formation comprising;

designating a source element by an address string that is a pointer to an eXtensible Markup Language node;

designating a target element by an address string that is a pointer to an eXtensible Markup Language node;

creating a type-link that relates the source element to the target element by an address string that is a pointer to an eXtensible Markup Language node;

defining characteristics of the type-link that define how changes to the source element and target element impact the target element and source element, respectively;

defining characteristics of the type-link, and propagating changes between the source elements and the target elements by conducting delayed eXtensible Stylesheet Language transformations, wherein changes indicated by composite type-links are not evaluated until there is a change to a source element corresponding to a respective type-link, and the kernel will only re-compute eXtensible Stylesheet Language transformations dependent on the source element corresponding to the respective type-link, and wherein, for at least a first one of the plurality of composite type-links, the respective source element is a type-link of at least a second one of the plurality of composite type-links.

2. The method of claim 1 wherein at least a portion of the diverse data is html formatted data pulled from an internet source.

3. The method of claim 1 wherein the defining characteristics of the type-link comprises accessing a context control menu and selecting a pre-configured type-link configuration.

4. The method of claim 1 wherein designating at least one of the source element and the target element comprises hovering a pointer over an expansion control to expand an outline, thereby exposing at least one of the source element and the target element.

5. The method of claim 1 further comprising re-defining the configuration of the type-link by hovering a pointer over the type-link to induce the appearance of a type-link menu for selecting an alternative type-link configuration.

6. The method of claim 1 further comprising viewing a composite type-link of the plurality of composite type-links by conducting a user-definable action to activate a composite type-link viewing mode for selecting, modifying, and deleting composite type-links.

7. The method of claim 6 further comprising sorting the composite type-link viewing mode by at least one of type-link type, type-link author, type-link creation date, type-link modification date, type-link priority, and type-link relationship to other type-links.

8. The method of claim 1 further comprising viewing a composite type-link of the plurality of composite type-links by conducting a user-definable action to activate a composite type-link outline viewing mode for selecting, modifying, and deleting composite type-links.

9. The method of claim 1 further comprising defining a system of type-link indicators for placing with at least one of the source elements and the target elements, the type-link indicators enabling identification of the composite type-link when at least one of the source elements and target elements are not visible on a user interface.

10. The method of claim 1 further comprising organizing the diverse data into an outline.

11. The method of claim 1, wherein changes indicated by the composite type-link are not evaluated until there is a user selection of a source element corresponding to a type-link.

12. The method of claim 1, further comprising:
forming at least one composite type-link that is a complex composite type-link comprising:
designating a first composite type-link that is the source element;
designating a second composite type-link that is the target element; and
creating a type-link relating the first composite type-link and the second composite type-link.

13. The method of claim 12 wherein the forming at least one composite type-link that is a complex composite type-link comprises designating one of the composite type-links to have a first configuration type, and designating the second of the composite type-links to have a second configuration type.

14. A computerized system for organizing diverse data within a computer processing environment comprising:
a non-transitory computer-readable medium storing a plurality of composite type-links, each composite type-link comprising;
a source element;
a target element;
a type-link for relating the source element to the target element wherein the type-link has user-definable parameters, and wherein a user-elected relationship defines how changes to the source element and target element are made based on changes made to the target element and source element, respectively,
wherein each of the source element, the target element, and the type-link is an address string that is a pointer to an eXtensible Markup Language (XML) node;
a processor providing a user interface for displaying the plurality of composite type-links on a display device; and
a kernel that propagates changes between the source elements and the target elements, and conducts delayed eXtensible Stylesheet Language (XSL) transformations wherein changes indicated by composite type-links are not evaluated until there is a change to a source element corresponding to a respective type-link, and the kernel will only re-compute the eXtensible Stylesheet Language (XSL) transformations dependent on the source element corresponding to the respective type-link,
wherein, for at least a first one of the plurality of composite type-links, the respective source element is a type-link of at least a second one of the plurality of composite type-links.

15. The system as in claim 14 further comprising a kernel, the kernel further comprising:
a type-link cache for retrieving all the type-links to or from the source elements and the target elements, and
a plurality of separate type-link caches for retrieving all the type-links to or from a given element.

16. The system as in claim 14 wherein the changes to the source elements or target elements are effected by an eXtensible Markup Language element for delayed evaluation, the element being saved to enable future propagation of changes.

17. The system as in claim 14 wherein the user interface for displaying the composite type-links displays information in both eXtensible HyperText Markup Language and Scalable Vector Graphics.

18. The system as in claim 14 further comprising user action commands.

19. The system as in claim 14 further comprising:
a display for
displaying a plurality of panes each containing source elements and target elements in an outline,
displaying type-links as lines between the source elements and the target elements,
and displaying a type-link menu containing type-link categories based on the characteristics of a pane,
wherein, when there are multiple type-links between source elements and target element, the display is configured to display an indication of the multiple type-links; and
event listeners designed to capture a user's interaction with the user interface, wherein, when a user selects a type-link category from the type-link menu, the system is configured to display a prompt for entry of parameters.

20. The system as in claim 14 further comprising a transformation for forming the composite type-link.

21. The system as in claim 14 wherein at least one of the source element and the target element exists in an outline.

22. The system as in claim 14 wherein at least one composite type-link is a complex composite type-link comprising:
a first composite type-link that is the source element;
a second composite type-link that is the target element;
and a type-link relating the first composite type-link and the second composite type-link.

23. The system as in claim 22 wherein the complex composite type-link structure comprises multiple dependent composite type-links, and wherein the multiple dependent composite type-links undergo delayed evaluation.

* * * * *